United States Patent
Engelman et al.

(10) Patent No.: US 7,586,628 B2
(45) Date of Patent: Sep. 8, 2009

(54) METHOD AND SYSTEM FOR RENDERING UNICODE COMPLEX TEXT DATA IN A PRINTER

(75) Inventors: Jeffery A. Engelman, Mead, CO (US); Reinhard H. Hohensee, Boulder, CO (US); Terry S. Luebbe, Mantorville, MN (US); David E. Stone, Longmont, CO (US); John T. Varga, Longmont, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 1143 days.

(21) Appl. No.: 10/601,025

(22) Filed: Jun. 20, 2003

(65) Prior Publication Data

US 2004/0257591 A1    Dec. 23, 2004

(51) Int. Cl.
*G06F 15/00*    (2006.01)
*G06K 1/00*    (2006.01)

(52) U.S. Cl. .................... 358/1.11; 358/1.15; 358/1.16; 358/1.17; 358/1.18

(58) Field of Classification Search .................. 358/1.1, 358/1.11–1.15, 3.28; 345/467; 715/542; 235/494; 707/104.1
See application file for complete search history.

(56) References Cited

U.S. PATENT DOCUMENTS

| 5,526,477 | A | * | 6/1996 | McConnell et al. ......... 345/467 |
| 5,583,970 | A | | 12/1996 | Strobel |
| 5,706,410 | A | | 1/1998 | Bagley et al. |
| 5,729,666 | A | | 3/1998 | Konsella et al. |
| 5,793,381 | A | | 8/1998 | Edberg et al. |
| 5,966,637 | A | | 10/1999 | Kanungo et al. |
| 6,024,289 | A | * | 2/2000 | Ackley ....................... 235/494 |
| 6,204,782 | B1 | | 3/2001 | Gonzalez et al. |
| 6,252,671 | B1 | * | 6/2001 | Peng et al. .................. 358/1.11 |
| 6,661,416 | B2 | * | 12/2003 | Muikaichi et al. ........... 345/467 |
| 6,825,941 | B1 | * | 11/2004 | Nguyen et al. ............. 358/1.15 |
| RE38,758 | E | * | 7/2005 | Bloomberg et al. ......... 235/494 |
| 6,919,966 | B2 | * | 7/2005 | Nguyen et al. ............. 358/1.13 |
| 6,972,863 | B2 | * | 12/2005 | Parry ........................ 358/1.15 |
| 7,061,630 | B2 | * | 6/2006 | Murray ....................... 358/1.12 |
| 7,079,264 | B2 | * | 7/2006 | Nguyen et al. ............... 358/1.1 |
| 7,079,277 | B2 | * | 7/2006 | Fukazawa ................... 358/1.15 |
| 7,155,672 | B1 | * | 12/2006 | Adler et al. ................. 715/542 |
| 7,202,977 | B2 | * | 4/2007 | Robinson et al. ........... 358/3.28 |
| 2006/0253493 | A1 | * | 11/2006 | Tamas et al. .............. 707/104.1 |

* cited by examiner

*Primary Examiner*—Edward L Coles
*Assistant Examiner*—Satwant K Singh
(74) *Attorney, Agent, or Firm*—Duft Bornsen & Fishman, LLP

(57) ABSTRACT

A method and system for providing a printer for printing an encoded data stream. The stream includes a section of complex text data. The code is preferably Unicode, and the complex text data is preferably Unicode complex text. The printer includes a font, a text parser, and a layout engine. The font includes a plurality of glyphs. The text parser parses the data stream to determine the section of complex text data in the data stream. The layout engine is coupled to the text parser and with the font. The layout engine receives the section of complex text data from the text parser and determines at least one of the plurality of glyphs and glyph positions corresponding to the section of complex text data.

13 Claims, 3 Drawing Sheets

METHOD AND SYSTEM FOR RENDERING UNICODE COMPLEX TEXT DATA IN A PRINTER

FIELD OF THE INVENTION

The present invention relates to computer systems, and more particularly to a method and system for rendering complex text data, such as Unicode complex text, in a printer.

BACKGROUND OF THE INVENTION

In order to print data, such as text, the data to be printed is encoded. The encoding schemes represent the characters to be printed. Because there are numerous written languages having distinct characters, the encoding schemes represent, for example, the characters in different languages. Although there are various schemes utilized to encode data, Unicode is a standardized code for representing text. Unicode includes a code word for each character in a particular language. For example, one code word in Unicode would represent a Chinese pictograph, another code word in Unicode represents an Arabic character, while yet another code word in Unicode represents a character in the Latin alphabet. The code words also have a particular length. Unicode uses a two byte code word for most characters. In addition, Unicode groups characters in a particular numeric range. For example, all Arabic characters are represented by Unicode code words within a particular numeric range.

In addition to using a particular encoding scheme, a font is also used to print the data stream. For example, an Open Type font might be used in conjunction with Unicode. The font specifies the glyph, which is the character shape actually printed by a conventional printer. Thus, the font would indicate whether the "A" represented by the Unicode code word is a Times New Roman glyph or an Arial glyph. The font could also include Chinese pictographs, Arabic characters or other characters. The font is used to convert between the code word and the glyph. For example, the font might include an encoding table and a glyph table. The encoding table would be used to convert the code word for a particular encoding scheme to a corresponding glyph index. The glyph table would be used to convert the glyph index to a particular glyph. The glyph would then be printed in a particular location on the page corresponding to the code word.

Using Unicode code words in a data stream, a conventional computer system could convert Unicode to other data, for example a bit map of the glyph to be printed and the location of the glyph. This data is provided to a conventional printer. The conventional printer would print the glyph in the location corresponding to the Unicode code word. In such rendering a particular code word or set of code words always corresponds to the same glyph or set of glyphs. Thus, one-to-one rendering of a code word to a glyph is performed.

Although encoding schemes such as Unicode provide a code word for each character, one of ordinary skill in the art will readily recognize that in certain, complex languages, the glyph used to represent a given character depends upon its context. For example, in Arabic, Indic, and Thai language groups, the glyph used depends upon the surrounding characters. In addition, certain languages are written in a different order. English is typically written from left to right. However, other scripts are written from right to left. In addition, some scripts are written both right to left and left to right. For example, in Hebrew and Arabic, text is written right to left, but numbers are written left to right. As a result, the processing of code words is highly dependent upon the language. For complex languages, for example those read in a different order or having characters that are context dependent, identity and/or order of glyphs depend upon the context. Thus, printing of complex text data, such as the complex text described above, cannot be performed using one-to-one rendering.

FIG. 1 depicts a conventional system 10 used to print data including complex text data. The conventional system 10 might print text using an encoding scheme such as Unicode. For clarity, the conventional system 10 is described in the context of Unicode. The conventional system 10 includes a computer system 20 and a printer 30. The computer system 10 might include one or more clients and a print server or a desktop computer. The conventional computer system 20 includes a conventional formatter 22 and, for certain complex text data, a conventional layout engine 24, and a conventional font 26. The conventional formatter 22, conventional layout engine 24, and font 26 might reside on a print server (not shown) or a desktop. The conventional formatter 22 formats a data stream to be printed. The data stream is encoded in Unicode. Consequently, the conventional formatter 22 uses the conventional layout engine 24 for Unicode complex text. The conventional layout engine 24 might be a Unicode layout engine such as the Uniscribe layout engine for WINDOWS. The conventional layout engine 24 can typically run on platforms such as Windows or UNIX. The font 26 may be an Open Type font that is used to render complex text.

The conventional layout engine 24 analyzes complex text data, such as Unicode complex text, and determines the appropriate glyph for a particular Unicode code word. The conventional layout engine 24 thus includes data related to languages and contexts. The conventional layout engine 24 utilizes this data to analyze complex text, determine contexts and thus determine the appropriate glyph. The conventional layout engine 24 thus also uses the font 26. For example, if the font 26 is an Open Type font, the conventional layout engine 24 would determine the appropriate glyph and, using the font 26, determine the appropriate glyph indices. Alternatively, the conventional layout engine 24 might determine a bit pattern for the glyph using the conventional rasterizer 28. This would occur when the printer 30 does not support the font 26. For example, the conventional layout engine 24 might use the font 26 to determine the appropriate glyph indices and, using the glyph indices, the appropriate glyph. The conventional rasterizer 28 might then output a bit pattern of the appropriate glyph.

FIG. 2 depicts a conventional method 50 for printing text encoded using Unicode and including Unicode complex text. The print data is obtained, for example from a client, via step 52. The conventional layout engine 24 in the computer system 20 is used to convert any Unicode complex text in the print stream into glyphs, via step 54. In order to perform step 54, the conventional layout engine 24 utilizes the font, described above. In converting the Unicode complex text into glyphs in step 54, the conventional layout engine 24 and conventional rasterizer 28 typically output the bit patterns of the glyphs.

The remaining portion of the Unicode text, which is not Unicode complex text, is rendered using one-to-one rendering, via step 56. The result of one-to-one rendering is bit patterns. In addition, in contrast to the Unicode complex text, one-to-one rendering might take place in the conventional printer 30 rather than in the conventional computer system 20. The conventional data stream, which includes bit patterns for Unicode complex text and Unicode code words for the remaining Unicode text, is passed to the conventional printer 30 for printing, via step 58. The conventional data stream also includes the locations of the glyphs. The conventional printer 30 then prints the data stream using the conventional rasterizer 34, via step 60. Step 60 might include performing one-to-one rendering for Unicode data that is not complex. Step 60 also includes placing the glyphs in the appropriate positions on the page.

Although the conventional system 10 and conventional method 50 function, one of ordinary skill in the art will readily recognize that there are drawbacks. The data for the Unicode complex text that is passed to the printer 30 is typically in the form of bit patterns. In any case, the code words for the Unicode complex text are not passed to the conventional printer 30. Once the bit patterns are generated, neither the computer system 20 nor the conventional printer 30 has any knowledge of the text represented by the data corresponding to the Unicode complex text. The data stream can no longer be processed for text operations, such as sorting, searching, indexing, merging or repurposing. In addition, bit patterns for a glyph are relatively large in comparison to the corresponding Unicode code words. Consequently, the transmission of data between the conventional computer system 20 and the conventional printer 30 may be inefficient and time consuming.

Accordingly, what is needed is an improved system and method for printing Unicode complex text data. The present invention addresses such a need.

SUMMARY OF THE INVENTION

The present invention provides a method and system for providing a printer for printing an encoded data stream. The data stream includes a section of complex text data. The code is preferably Unicode, and the complex text data is preferably Unicode complex text. The printer comprises a font, a text parser, a rasterizer, and a layout engine. The font includes a plurality of glyphs. The text parser is coupled with the font and parses the data stream to determine the section of complex text data in the data stream. The complex text data could already be identified by some mark generated by the formatter. The layout engine is coupled to the text parser and with the font. The layout engine receives the section of complex text data from the text parser and determines at least one of the plurality of glyphs corresponding to the section of complex text data.

According to the system and method disclosed herein, the present invention provides a printer capable of printing a data stream including complex text such as Unicode complex text. Thus, data transmission may be more efficient and the ability to perform additional text operations on the data stream being printed is preserved.

DETAILED DESCRIPTION OF THE INVENTION

The present invention relates to an improvement in printers. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for providing a printer for printing a data stream that includes a section of complex text data. The data stream is preferably Unicode data, and the complex text data is preferably Unicode complex text data. The printer comprises a font, a text parser, and a layout engine. The font includes a plurality of glyphs. The text parser is coupled with the font and parses the data stream to determine the section of complex text data in the data stream. The layout engine is coupled to the text parser and with the font. The layout engine receives the section of complex text data from the text parser and determines at least one of the plurality of glyphs corresponding to the section of complex text data.

The present invention will be described in terms of a particular printer having particular components. However, one of ordinary skill in the art will readily recognize that this method and system will operate effectively for other printers and other and/or additional components not inconsistent with the present invention. The present invention is also described in the context of a single section of complex text data in a data stream. However, one of ordinary skill in the art will readily recognize that the method and system operate effectively for multiple sections of complex text data in a data stream as well as multiple data streams. Finally, the present invention is described in terms of a preferred embodiment utilizing Unicode complex text. One of ordinary skill in the art will recognize, however, that the present invention can operate effectively for other encoding schemes and other types of data.

Figure 1:
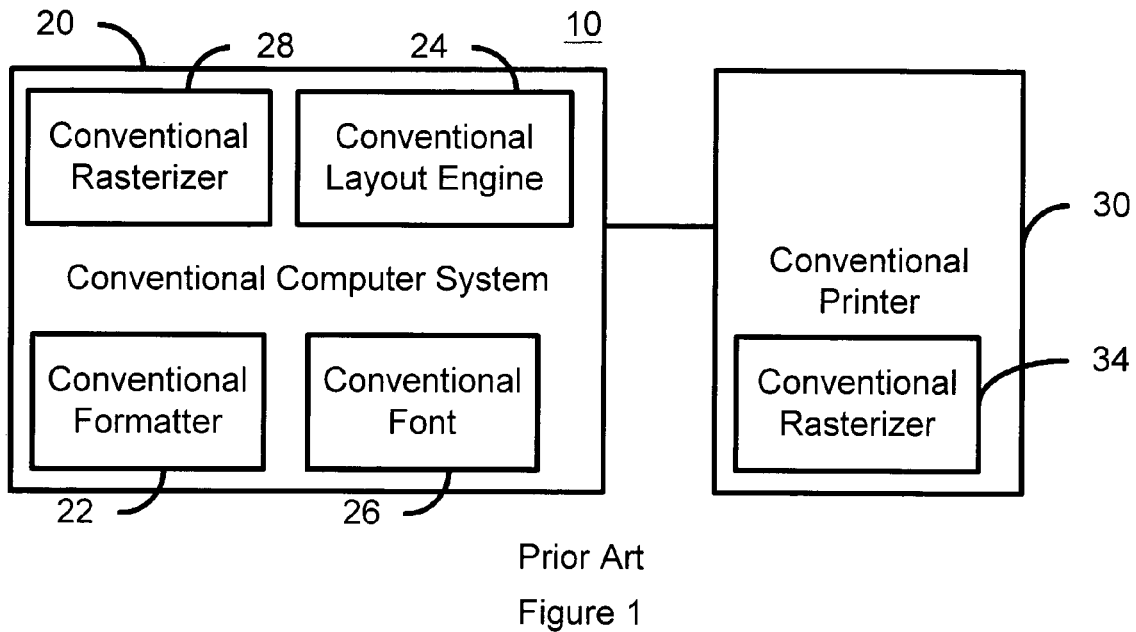
FIG. 1 is a diagram of a conventional computer system that may be used in printing encoded data.
Figure 2:
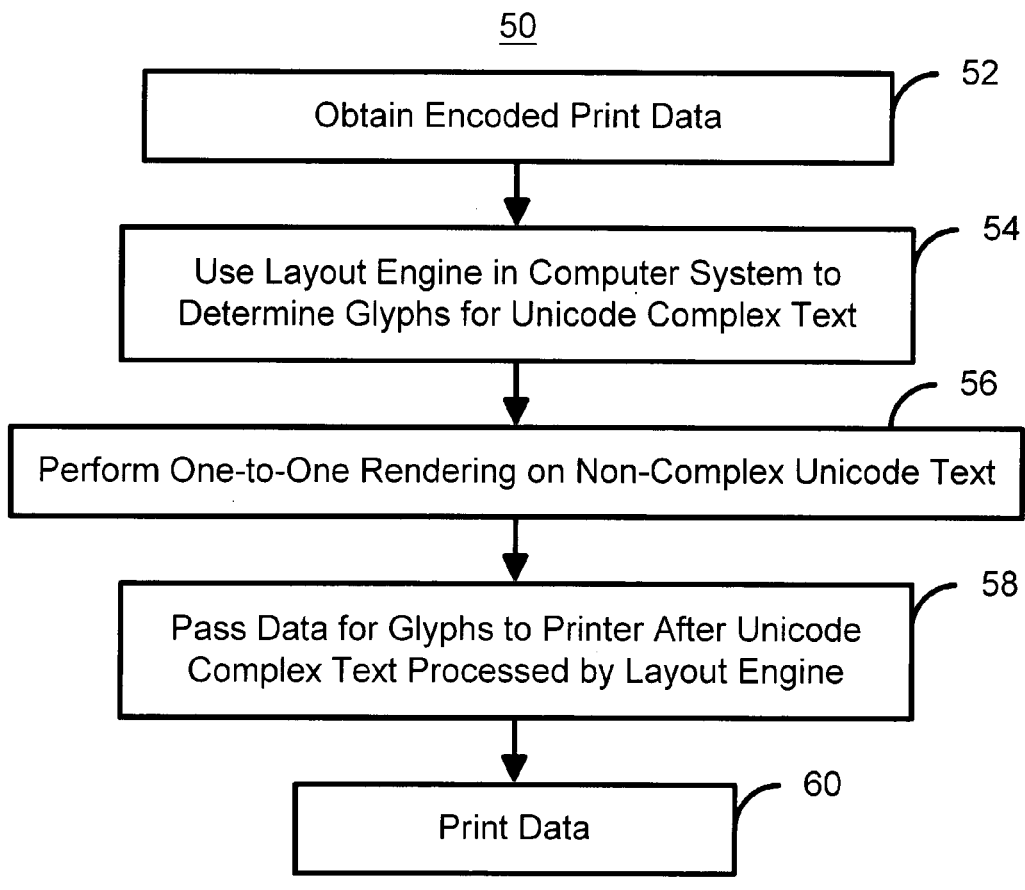
FIG. 2 is a flow chart depicting a conventional method for printing encoded data including complex text data.
Figure 3:
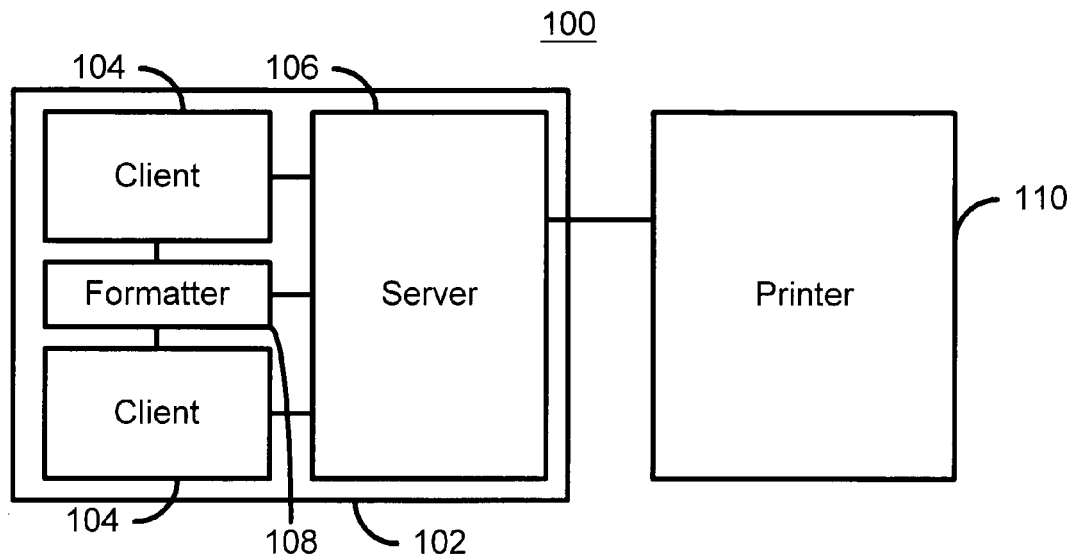
FIG. 3 is a block diagram depicting one embodiment of a computer system using a printer in accordance with the present invention that prints complex text data represented using a code such as Unicode.

To more particularly illustrate the method and system in accordance with the present invention, refer now to FIG. 3, depicting one embodiment of a system 100 that uses a printer 110 in accordance with the present invention that prints complex text data represented using a code such as Unicode. The system 100 is described in the context of Unicode. However, one of ordinary skill in the art will readily recognize that the system 100 can be extended to other encoding schemes. The system 100 preferably includes a computer system 102. The computer system 102 preferably includes one or more clients 104 and a server 106. However, in an alternate embodiment, the computer system 102 could be a desktop. The system 100 includes a formatter 108. In one embodiment, the formatter 108 is essentially a conventional formatter that provides encoded data in a data stream to be printed. However, in another embodiment, the formatter 108 would mark sections of the print stream that include complex text data, such as Unicode complex text. In such an embodiment, the formatter 108 would preferably mark a section of complex text in a data stream provided from the computer system 102 to the printer 110.

The printer 110 is capable of receiving a data stream of encoded data which includes one or more sections of complex text. The printer 110 renders the data stream, including the section(s) of complex text within the data stream. Thus, data stream including Unicode complex text can be provided to the printer 110, then rendered. As a result, the Unicode code words are preserved even in the printer 110. Consequently, the text being printed can be searched, sorted or have other analogous operations performed before or after being sent to the printer 110. In addition, because the code words for characters are typically significantly smaller than bit patterns for glyphs, the transmission of the data stream to the printer 110 may be performed more efficiently.

Figure 4:
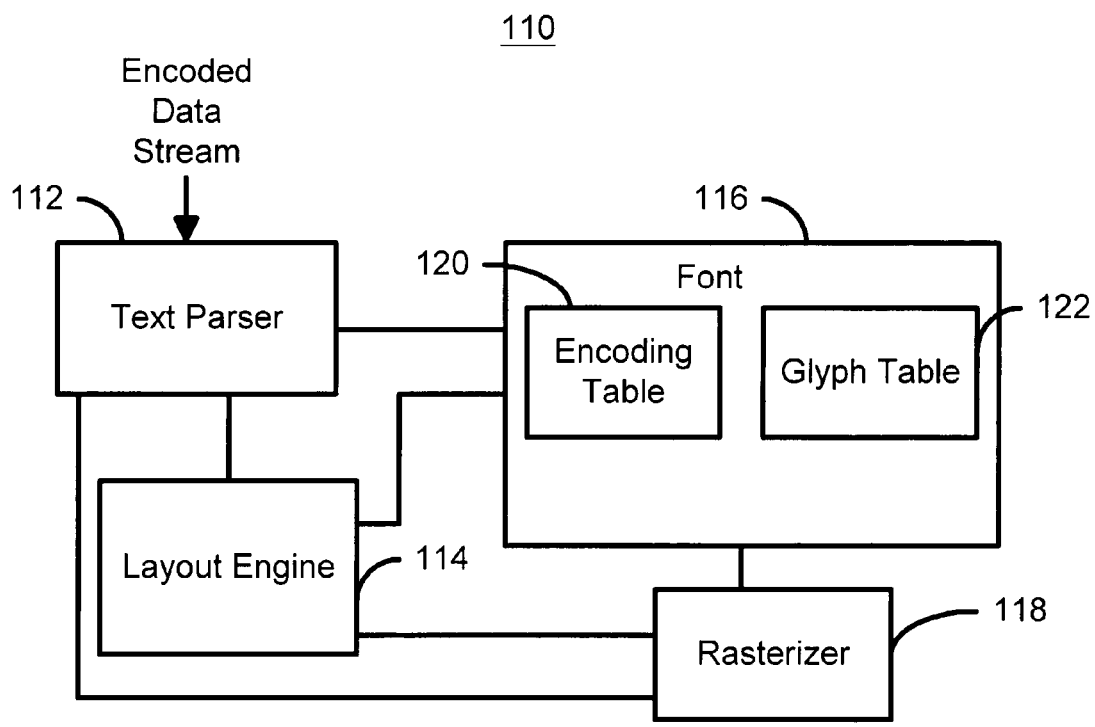
FIG. 4 is a block diagram depicting one embodiment of a printer in accordance with the present invention that prints complex text data represented using a code such as Unicode.

FIG. 4 is a block diagram depicting one embodiment of a printer 110 in accordance with the present invention that prints complex text data represented using a code such as Unicode. The printer 110 is thus described in the context of Unicode and Unicode complex text. However, the printer 110 may operate effectively for other encoding schemes. The printer 110 receives the data stream from the computer system 102. The printer 110 includes a text parser 112, a layout engine 114, a font 116 and a rasterizer 118.

The text parser 112 receives the data stream provided to the printer 110. The text parser 112 parses the data stream to determine sections of complex text data, such as Unicode complex text, in the data stream. The data stream identifies the font to be used. In a preferred embodiment, the text parser 112 searches the data stream for Unicode code words within particular ranges. The ranges correspond to complex languages, such as Arabic or Thai, which are associated with Unicode complex text. In Unicode, code words for particular languages lie within a corresponding range. Consequently, searching for code words within ranges corresponding to the complex languages allows the text parser 112 to determine code words that correspond to Unicode complex text. Also in a preferred embodiment, the text parser 112 can thus determine the start and end of sections of complex text in the data stream. In an alternate embodiment, the text parser 112 locates the complex text based on marks made by the formatter 108. The text parser 112 also passes the corresponding complex text, as well as the appropriate locations, to the layout engine 114. The text parser 112, in combination with the font 116 and the rasterizer 118 performs one-to-one rendering on the remaining portion of the data stream not including complex text data. Preferably, the text parser 112 passes the remaining portion of the data stream not including complex text data to the rasterizer 118, which performs one-to-one rendering to convert the text data to glyphs. In addition, the positions of the glyphs in the page are also determined.

The layout engine 114, which is located in the printer 110, analyzes complex text data, such as Unicode complex text, from the text parser 112. The layout engine 114 is preferably substantially the same as the conventional layout engine. The layout engine 114 performs language dependent processing and determines the appropriate glyphs and glyph positions for the Unicode code words in the sections of complex text data from the text parser 112. Note that the glyphs could include null glyphs, which have no active elements in their bitmaps, such as a space. The layout engine 114 thus includes data related to languages and contexts. The layout engine 114 utilizes this data to analyze complex text, determine contexts, and direction and thus determines the appropriate glyphs, glyph positions and text direction. The layout engine 114 thus also uses the font 116. For example, the font 116 is preferably an Open Type font. The layout engine 114 would determine the appropriate glyphs and, using the font 116, determine the appropriate glyph indices. The layout engine 114 might then use the font 116, including passing the glyph indices to the font 116 or accessing the resources of the font 116. The layout engine 114 might pass the glyph indices and positions to the rasterizer 118. The rasterizer 118 then uses the glyph indices and the font 116 to retrieve the glyphs, and to rasterizer the glyphs into bit maps. The bit maps are then positioned using the information from the layout engine 114.

The font 116 is selected by the data stream. Thus, the font 116 is subject to change. In a preferred embodiment, the font 116 is an Open Type font. However, in an alternate embodiment, the font 116 might be another type of font. In a preferred embodiment, the font 116 includes an encoding table 120 and a glyph table 122. The encoding table 120 matches Unicode code words with corresponding glyph indices for the font being used. The glyph table 122 matches glyph indices with corresponding glyphs. To perform one-to-one rendering, the text parser 112 passes Unicode code words to the rasterizer 118, which uses the font 116 to map the code words first to glyph indices and then to glyphs. In other words, to print a portion of the data stream not including complex text, the rasterizer 118 uses the font 116 to convert Unicode code words to glyphs, preferably by one-to-one rendering that converts Unicode code words to glyph indices using the encoding table 120 and then converts the glyph indices to glyphs using the glyph table 122. To print sections of complex text in the data stream, the rasterizer 118 preferably receives glyph indices and positions from the layout engine 114. The font 116 converts the glyph indices to the appropriate glyphs using the glyph table 122. Thus, the text parser 112 in combination with the layout engine 114 and font 116 locates the complex text, utilizes the layout engine 114 to determine the appropriate glyphs, for example in the form of glyph indices, and uses the font 116 to obtain the actual glyphs.

The appropriate glyphs and their positions for the data stream are passed to the rasterizer 118. The rasterizer 118 places the glyphs for the data stream in the corresponding locations on the page. The data stream can then be printed, for example using a print device (not shown) and/or other components.

Thus, the printer 110 is capable of receiving a data stream of code and which includes one or more sections of complex text. The printer 110 renders the data stream, including the section(s) of complex text within the data stream. Thus, data stream including Unicode complex text can be provided to the printer 110, then rendered. As a result, the Unicode code words are preserved even in the printer 110. Consequently, the text being generated by the computer system can be searched, sorted or have other analogous operations performed before or after being sent to the printer 110. In addition, because the code words for characters are typically significantly smaller than bit patterns, the transmission of the data stream to the printer 110 may be performed more efficiently.

Figure 5:
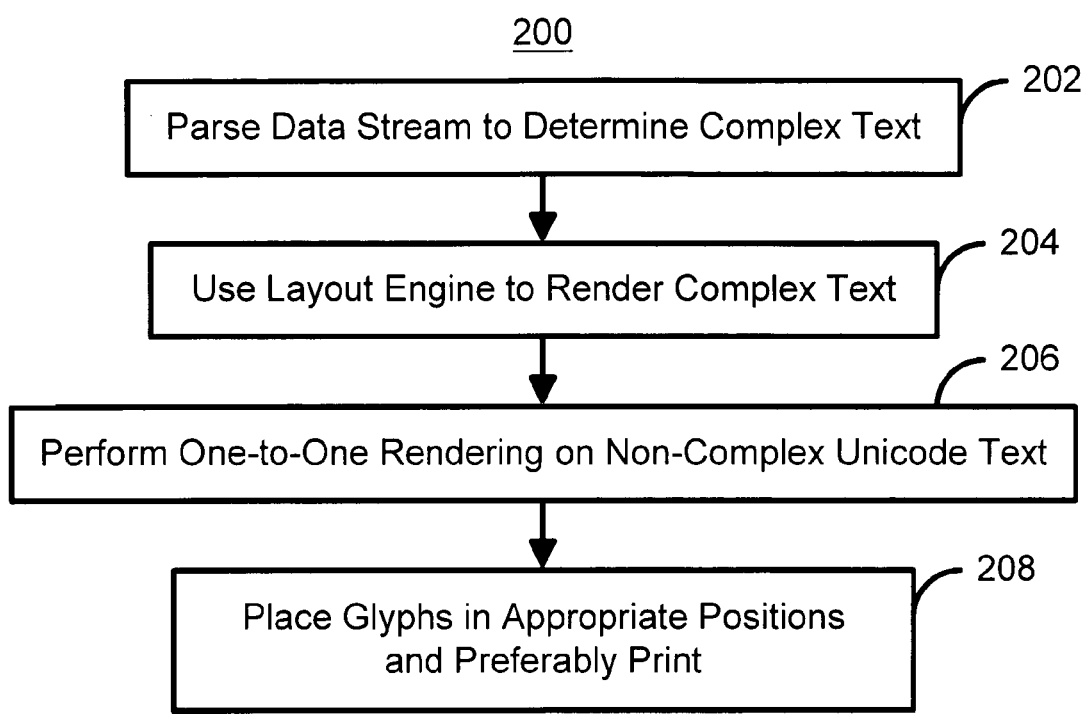
FIG. 5 is a high-level flow chart depicting one embodiment of a method in accordance with the present invention for printing data represented using a code.

FIG. 5 is a high-level flow chart depicting one embodiment of a method 200 in accordance with the present invention for printing encoded text data. The method 200 is preferably implemented using the printer 110. Thus, the method 200 is described in the context of the system 100 and printer 110. The method 200 is also described in the context of Unicode, which is a preferred embodiment. However, the method 200 may operate effectively for other encoding schemes. The method 200 preferably commences after the printer 110 has begun receiving the data stream from the computer system 102. The data stream may include one or more sections of Unicode complex text. The data stream is parsed to identify sections of complex text data, such as Unicode complex text, via step 202. Step 202 is preferably performed using the text parser 112. Also in a preferred embodiment, step 202 is performed by searching the data stream for Unicode code words in particular ranges. Glyphs for the sections of complex text data that are identified in step 202 are determined using the layout engine 114, via step 204. Thus, step 204 includes processing which is language and font dependent in order to identify the appropriate glyphs for the Unicode complex text. In a preferred embodiment, step 204 includes outputting the appropriate glyph indices from the layout engine 114. The glyphs for remaining portions of the data stream, which do not include complex text, are determined preferably using one-to-one rendering, via step 206. Step 206 is preferably performed using the font 116. The glyphs determined in step 204 and 206 are placed in the appropriate positions on the paper, via step 208. In a preferred embodiment, step 208 is performed using the rasterizer 118.

Thus, the method 200 receives a data stream of code that includes one or more sections of complex text. The method 200 renders the data stream in the printer 110, including the section(s) of complex text within the data stream. Thus, data streams including Unicode complex text can be provided to the printer 110, then rendered. As a result, the Unicode code words are preserved even in the printer 110. Consequently, the text generated by the computer system 100 can be searched, sorted or have other analogous operations performed before or after being sent to the printer 110. In addition, because the code words for characters are typically significantly smaller than bit patterns, the transmission of the data stream to the printer 110 may be performed more efficiently.

A method and system has been disclosed for providing a printer capable of printing complex text data from a data stream of code. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A printer for printing a Unicode data stream, the data stream including a section of Unicode complex text data, the printer comprising:
   a text parser within the printer adapted to parse the Unicode data stream to determine the section of Unicode complex text data in the Unicode data stream;
   a layout engine within the printer and coupled to the text parser, the layout engine adapted to receive the section of Unicode complex text data from the text parser, and adapted to determine at least one of a plurality of glyphs of at least one font corresponding to the section of Unicode complex text data; and
   a rasterizer within the printer coupled to the layout engine and the text parser, the rasterizer adapted to perform processing on the section of Unicode complex text data based on the language encoded by the data to position the at least one of the plurality of glyphs on a portion of a page.

2. The printer of claim 1 wherein the at least one font includes an encoding table and a glyph table, the encoding table including a plurality of codes and a plurality of glyph indices corresponding to the plurality of codes, the glyph table including the plurality of glyphs corresponding to the plurality of glyph indices.

3. The printer of claim 2 wherein the at least one glyph can include a null glyph.

4. The printer of claim 2 wherein the layout engine determines the at least one glyph by determining at least one index of the plurality of glyph indices for the section of Unicode complex text data and at least one position for the at least one glyph.

5. The printer of claim 2 wherein the text parser provides a remaining portion of the Unicode data stream not including the section of Unicode complex text data to the rasterizer to perform one-to-one rendering of a remaining portion of the Unicode data stream.

6. The printer of claim 1 wherein the text parser determines the section of Unicode complex text data based upon at least one code word for the section of Unicode complex text data.

7. The printer of claim 1 wherein the text parser determines the section of Unicode complex text data based upon at least one code word for the section of Unicode Complex text data.

8. A method for printing a Unicode data stream, the Unicode data stream including a section of Unicode complex text data, the method comprising the steps of:
   (a) parsing the Unicode data stream in a printer to determine the section of Unicode complex text data in the data stream;
   (b) utilizing a layout engine to receive the section of Unicode complex text data from the text parser and to determine at least one of the plurality of glyphs corresponding to the section of Unicode complex text data; and
   (c) performing processing of the section of Unicode complex text data based on the language encoded by the data to position the at least one of the plurality of glyphs on a portion of a page.

9. The method of claim 8 further comprising the step of:
   (d) utilizing an encoding table including a plurality of codes and a plurality of glyph indices corresponding to the plurality of codes, the glyph table including the plurality of glyphs corresponding to the plurality of glyph indices.

10. The method of claim 9 wherein the layout engine determines the at least one glyph by determining at least one index of the plurality of glyph indices for the section of Unicode complex text data and at least one position for the at least one glyph.

11. The method of claim 9 further comprising the step of:
    (e) utilizing a rasterizer to perform one-to-one rendering of a remaining portion of the Unicode data stream not including the section of Unicode complex text data.

12. The method of claim 8 wherein the data parsing step (a) further includes the step of:
    (a1) determining the section of Unicode complex text data based upon at least one code word for the section of Unicode complex text data.

13. The method of claim 8 wherein the data parsing step (a) further includes the step of:
    (a1) determining the section of Unicode complex text data based upon at least one marker for the section of Unicode complex text data.

* * * * *

UNITED STATES PATENT AND TRADEMARK OFFICE
CERTIFICATE OF CORRECTION

PATENT NO. : 7,586,628 B2 Page 1 of 1
APPLICATION NO. : 10/601025
DATED : September 8, 2009
INVENTOR(S) : Engelman et al.

It is certified that error appears in the above-identified patent and that said Letters Patent is hereby corrected as shown below:

At column 8, line 22, correct "one code word" to read "one marker".

Signed and Sealed this

Seventeenth Day of November, 2009

David J. Kappos
*Director of the United States Patent and Trademark Office*